United States Patent [19]

Day

[11] Patent Number: 4,659,304

[45] Date of Patent: Apr. 21, 1987

[54] MOLDING

[75] Inventor: Charles L. Day, Kennebunk, Me.

[73] Assignee: Palmer-Chenard Industries, Inc., Newington, N.H.

[21] Appl. No.: 828,730

[22] Filed: Feb. 11, 1986

[51] Int. Cl.$^4$ .................................. B29C 33/02
[52] U.S. Cl. .................... 425/406; 100/93 P; 219/461; 219/243; 425/DIG. 13
[58] Field of Search .............. 100/93 P; 219/461, 243; 425/DIG. 13, 406, 411

[56] References Cited

U.S. PATENT DOCUMENTS

| | | | |
|---|---|---|---|
| 3,015,292 | 1/1962 | Birdwell | 100/93 P |
| 3,119,728 | 1/1964 | Janapol | 100/93 P |
| 3,456,581 | 7/1969 | Zuber | 100/93 P |
| 3,754,499 | 8/1973 | Heisman et al. | 100/93 P |
| 3,951,724 | 4/1976 | Johnson et al. | 100/93 P |
| 4,357,523 | 11/1982 | Bleckmann | 219/461 |
| 4,398,991 | 8/1983 | Thies | 100/93 P |

FOREIGN PATENT DOCUMENTS

| | | | |
|---|---|---|---|
| 1128131 | 4/1962 | Fed. Rep. of Germany | 100/93 P |
| 144522 | 10/1980 | German Democratic Rep. | 100/93 P |
| 210112 | 5/1984 | German Democratic Rep. | 219/461 |

Primary Examiner—Tim Miles
Attorney, Agent, or Firm—Hayes, Davis & Soloway

[57] ABSTRACT

A mold assembly for supporting a mold in a molding press, heating elements for controlling the temperature of the mold and an insulating arrangement, disposed between the heating elements and structure of the molding press, having an insulating cavity defined by mold support structure and having thermally reflective means disposed in said cavity remote from the heating elements to reflect heat back through the cavity. The cavity may have an insulating material therein.

23 Claims, 6 Drawing Figures

MOLDING

This invention relates to an improved mold assembly which is applicable to many forms of molding including compression molding, transfer molding and injection molding. The invention is, however, particularly, though not exclusively, useful in the compression molding art.

Present practice in the compression molding art involves the use of a substantially monolithic mold and platen assemblies, each heated by electrical elements or by steam or oil heat, the assemblies being mounted to platens of a hydraulic press which are relatively moveable towards and away from one another under the control of a hydraulic actuator capable of applying a force, which may be of the order of 200 tons to mold sheet material disposed between the heated mold and platen assemblies involved. Typical materials involved in compression molding are rubber, and synthetic rubber, for example Neoprene. The technology is, however, also applicable to the molding of, for example, thermoplastic and thermosetting material, cellulosic materials and heating setting sintered materials etc. Due to the monolithic and massive nature of the mold and platen assembly utilized at the present time, the processes involved are energy inefficient with relatively long start-up times, often of the order of one and a half to two hours or more, being required for the molds to reach a desired operating temperature and with substantial heat loss resulting from the conductive nature of the monolithic assembly itself which usually has significant heat losses by conduction, convection and radiation. The relatively slow start-up time and the energy inefficiency of such assemblies results in the need for the use of large heating elements, as high as 25 kilowatts per platen for a two-foot square mold assembly.

It is an object of the present invention to provide a mold-support assembly suitable for use in compression molding having significantly greater energy efficiency and much quicker start-up time than the presently used mold assemblies, such as are described above, while at the same time being economical to manufacture, reliable and of relatively low mass. The result of achieving the objects of this invention is the need for significantly smaller heat energy to produce desired mold temperatures.

According to the present there is provided a mold support assembly for supporting a mold in a molding machine, comprising means for maintaining the temperature of the mold at a desired temperature and an insulating unit disposed between the temperature maintaining means and structure of a molding machine, said insulation unit having an insulating cavity defined by a mold support structure and having thermally reflective means disposed in said cavity remote from said temperature maintaining means.

The invention will now be described, by way of example, with reference to the accompanying drawings, in which.

Figure 1:
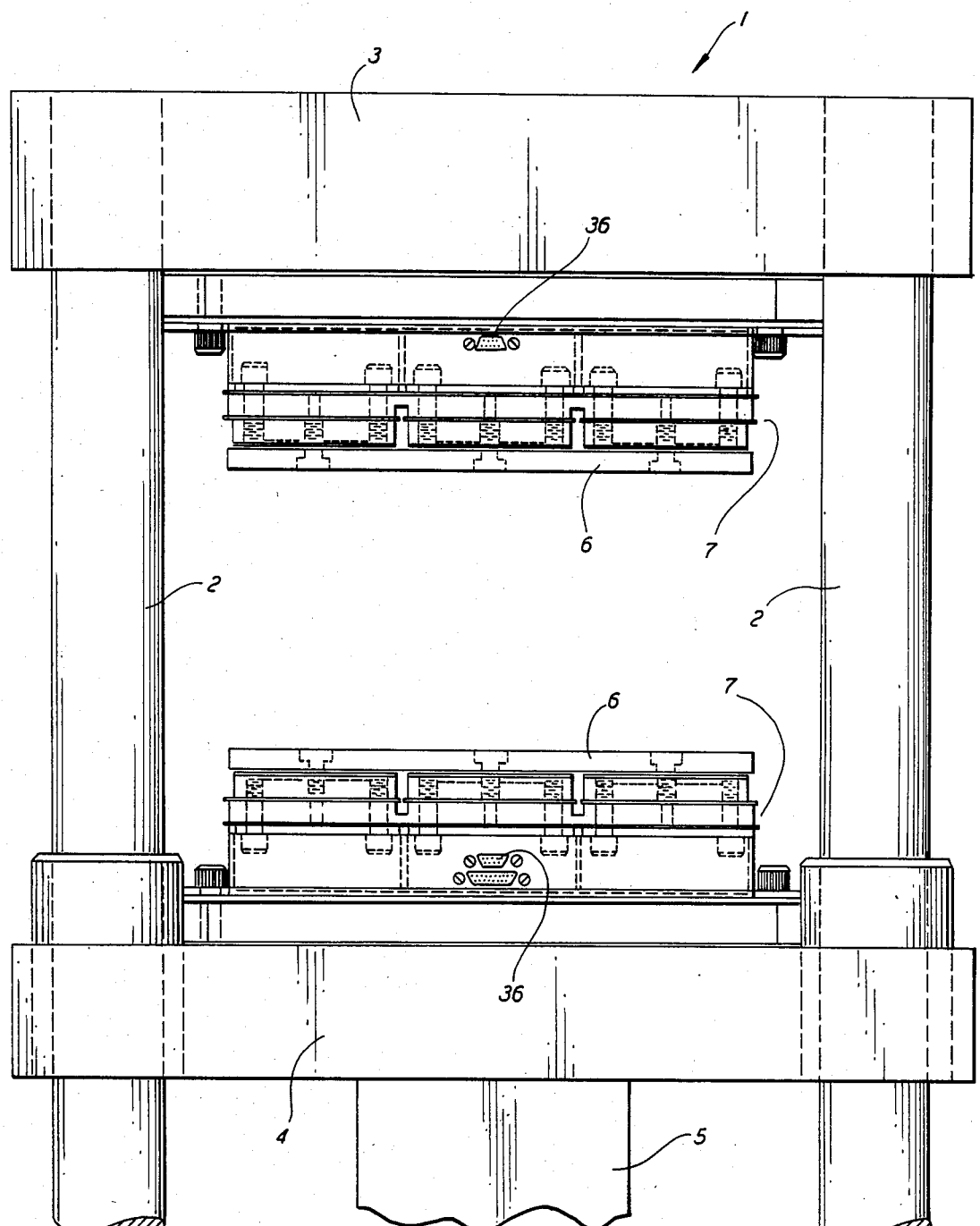
FIG. 1 is a diagrammatic elevation of a compression molding press with mating mold-support assemblies according to the present invention mounted therein.

With reference first to FIG. 1, a hydraulic compression molding press 1 includes platen support pillars 2 to the upper ends of which is rigidly supported a fixed platen 3 and slideably mounted upon which for movement toward and away from the fixed platen 3 is a movable platen 4. Movement of movable platen 4 relative to fixed platen 3 is controlled by a hydraulic actuator 5 disposed between the movable platen and a base (not shown) to which the pillars 2 are also rigidly attached.

Mating mold halves 6, between which the compression molding takes place, are supported by upper and lower mold-support assemblies 7. These assemblies 7 are essentially identical to one another. The mold halves define between themselves the desired product shape and the mating mold halves 6 are arranged to engage one another to produce the product of that desired shape by compression molding.

Figure 2:
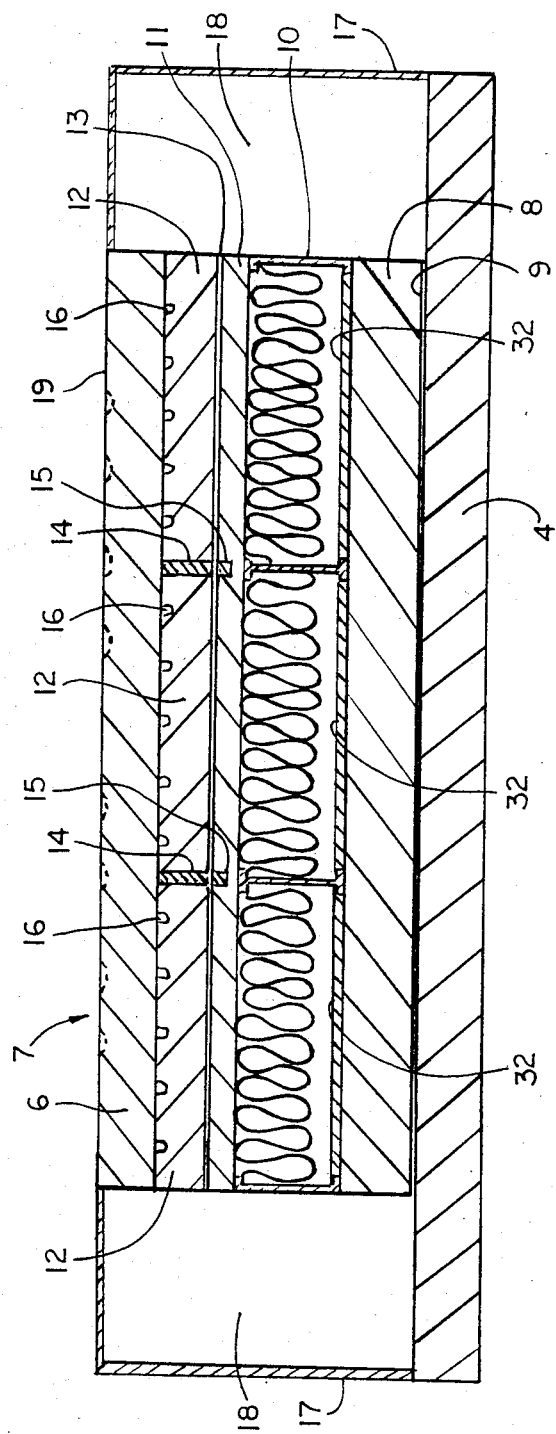
FIG. 2 is a cross sectional elevation of one of the mold-support assemblies of FIG. 1.

Now referring to FIG. 2, the mold-support assembly is diagrammatically shown in cross section mounted on moveable platen 4. This mold-support assembly comprises a secondary platen, a spaced from movable platen 4 by a thermally insulating layer of ceramic paper 9. Rigidly attached to the upper surface of the secondary platen 8 (the surface remote from the ceramic paper) is an insulation unit 10 which may be attached to the secondary platen 8 by clamping (or another form of minimum contact rigid attachment). A load distribution plate 11 is supported on the surface of the insulation unit 10 remote from the secondary platen 8. Three similar heating plates 12 with heating elements 16 facing upwardly from said load distribution plate are supported spaced by a thermally insulating layer of ceramic paper 13 on the surface of the load distribution plate 11, remote from the insulation unit 10.

The heating plates 12 are spaced apart laterally by elongate spaces 14 filled with ceramic paper. Immediately adjacent the elongate spaces 14, in the load distribution plate 11 are elongate grooves 15 underlying spaces 14 and extending into the load distribution plate from the surface thereof adjacent the heating plates 12.

In the surface of each heating plate 12 remote from the load distribution plate 11 is disposed a groove carrying an electrical heating element 16. Mounted against these electrically heating element carrying surfaces of the heating plates 12 is a mold half 6. A similar but inverted mold-support assembly includes the other mating mold half 6.

Mounted on platen 4 (a similar arrangement would be mounted relative to the other mold-support assembly on fixed platen 3) are polished metallic reflectors 17 which extend round the entire perimeter of the mold-support assembly in spaced relationship therefrom to define a substantially closed insulating cavity 18 around the entire perimeter of the assembly 7 extending from platen 4 to closely adjacent the molding surface 19 of mold half 6.

Figure 3:
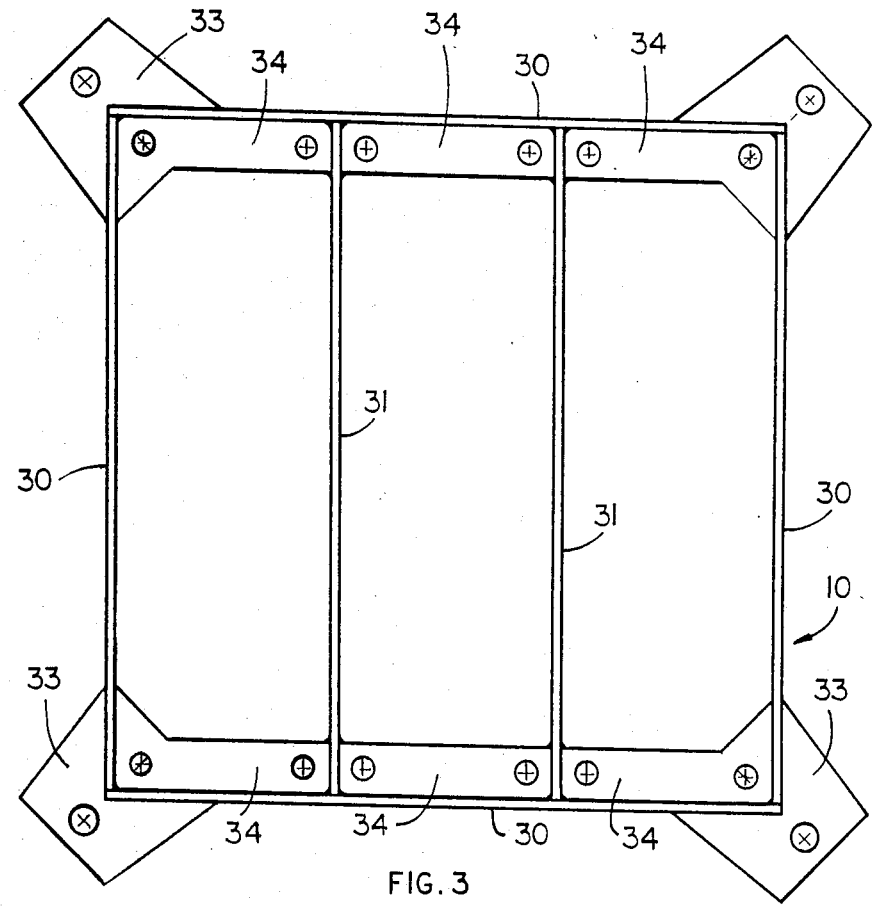
FIG. 3 is a plan view of the structure of an insulating unit forming a part of the mold-support assembly of FIG. 2.
Figure 4:
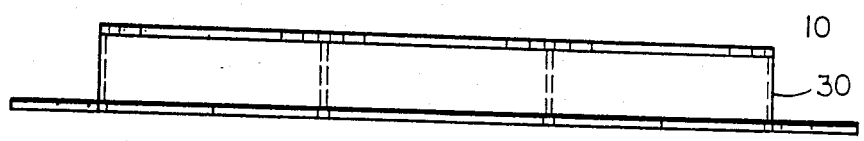
FIG. 4 is a side elevation of the unit of FIG. 3.

The insulation unit 10 will now be described in more detail with reference to FIGS. 2, 3 and 4. This description relates to a one-foot square mold-support assembly and specific details may vary with larger assemblies, for example, those for a two foot square mold. In the main such differences will be readily apparent to a man skilled in the art. However, certain differences will be pointed out as the description proceeds. The unit is constructed from 17-4 ph steel, a member of the stainless steel family which is a relatively poor conductor and which has a tensile strength of 190,000 pounds per square inch for a yield of 0.2 percent. This alloy has 17 percent chrome content and 4 percent nickel. It will be appreciated that the present invention is not restricted to this choice of material and that other materials could be used subject only to selection to minimize their thermal conductivity while maintaining sufficient material strength for the molding pressures involved.

The unit includes four channel section side members 30 welded together at their ends to form a closed side wall assembly for the unit. The flanges of the channel section members face into the unit and the webs of these members form the exterior of the sidewalls. The web thicknesses are chosen to be sufficient only to carry the molding pressures and may be of the order of 1/10 of an inch thickness where the molding pressures will not exceed 75 ton. The unit 10 is divided into three parallel cavities by two I-beam members 31, also constructed of the 17-4 ph material. These I-beam members have a web thickness also of 1/10 of an inch and are welded at their ends to an opposed pair of the side members 30 while being disposed parallel to the other pair of the side members 30.

Disposed in the cavities defined by the channel members and I-beam members 30, 31, adjacent the secondary platen 8 and covering essentially the entire surface thereof (excluding the portion engaged by members 30 and 31) are mirrors 32, preferably of silvered glass (these mirrors, as will be appreciated by a man skilled in the art could alternatively, for example, be of polished metal which would then be spaced by an air space from the surface of the secondary platen 8). Spaced from the mirrors 32, by an air gap is a thermally insulating material, for example, fiberglass, which substantially fills the remainder of the cavities defined by the members 30 and 31 (the presence of this insulating material is preferred but in some embodiments may be omitted leaving air stratification in the cavities and the air therein itself to provide a desired insulation).

The unit 10 is welded to flanges 33 and support webs 34 by which the mold support assembly is bolted together (see FIG. 1) and to the platen onto which the assembly is mounted.

Figure 5:
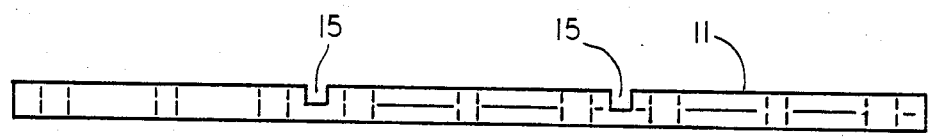
FIG. 5 is a side elevation of a load distribution plate forming a part of the mold-support assembly of FIG. 2.

The interior of the unit 10 is preferably polished, for example by electro polishing (alternatively, the interior could be tin plated to provide desired thermal reflection). Typically the thickness of the unit 10 is one and a half inches. The load distribution plate 11 is shown in elevation in FIG. 5. Grooves 15 are located and dimensioned to regulate heat flow between the portions of the plate 11 which are partially separated by these grooves. Plate 11 acts to stiffen the mold and is preferably a relatively poor thermal conductor. Suitable material may be 41-40 steel. The grooves overlie members 31 to ensure that plate stiffness is not jeopardized.

Figure 6:
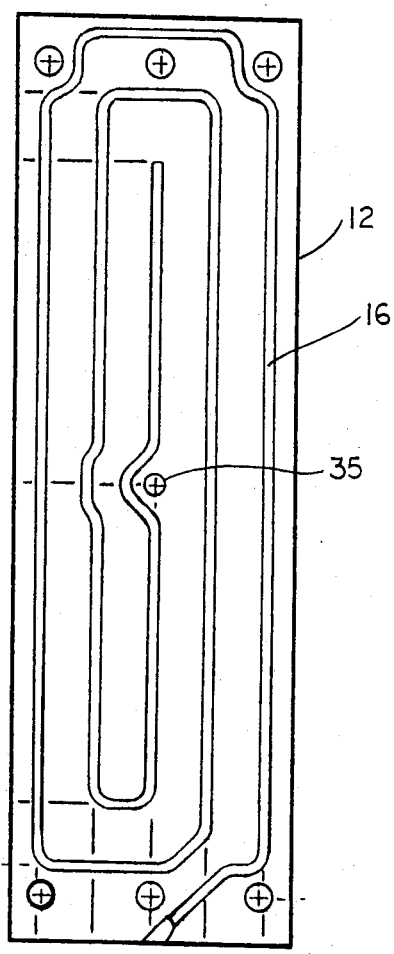
FIG. 6 is a plan view of a heating element plate of the mold-support assembly of FIG. 2.

The heating element plates 12 are, in this example carrying electrical heating elements 16. Each plate 12 carries a 650 watt element disposed in a groove having the form illustrated in FIG. 6. Central in each plate 12 is disposed an opening 35 which interconnects with an opening in the mold half 6 for the purpose of providing access for sensing mold temperature. Preferably the walls of this opening 35 are insulated thermally.

The elements of plates 12 of the two assemblies 7 are interconnectable by electric connectors 36 which also carry information with respect to molded temperatures, etc. Connector 37 connects both assemblies 7 to a controller capable of controlling the molding process. The material of the plates 12 is preferably highly thermally conductive and copper or silver would be appropriate. In this example a high nickel alloy (nickel 200) which comprises over 99 percent nickel is utilized (Another alternative would be an aluminum alloy 6061-T 6.)

The mold halves 6 may be thinner than conventional construction to reduce the thermal mass of the assembly because the support structure provided by the support assembly provides sufficient rigidity. Conventional materials are used for mold halves and the mold cavities are of conventional form.

The low mass and thermal insulating features of the mold-support assembly herein described provide a rapid heatup time (as quick as 20 minutes compared to one and a half hours or more for present systems) coupled with a high thermal efficiency which permits the use of significantly lower power to heating element than previously used (here 1950 watts per platen compared to four or more kilowatts per platen) for the present systems. An energy saving of 62 percent has been measured with heat energy utilization of 1000 watt hours/hour for the assembly of the present invention relative to 2200 watt hours/hour for a similarly sized monolithic structure as used in present systems. In addition, the fixed and moving platens of the press and associated structure remain significantly cooler, for example, the platens have been found to barely exceed 100° F. after eight hours of use of the press with the present invention when the mold is maintained at 500° F., as compared with the present arrangements in which the platens after a similar period with a similar mold temperature have been found to reach 300°-400° F. This lower temperature contributes significantly to the safe operation of the equipment and to the reduction in energy usage.

It should be noted that other materials for the insulating layer provided by the ceramic paper could be used, for example, Glass Therm could be used.

Energy savings with larger mold-support assemblies would be greater due to the smaller surface area of these relative to the volume of the assembly and the molding area. For example a two-foot square mold-support assembly utilized on a press having up to 200 tons of force available for the molding process could be heated by 3,000 watts of energy as opposed to the 1,950 watts in the one foot square arrangement already described. In such a two foot square assembly, the insulation unit might well have three I-beam members similar to members 31 disposed evenly throughout the interior of the unit in order to provide adequate support for the mold half and its load distribution plate. Three grooves 15 and four spaced heating units 12 would be associated with this arrangement. It will be appreciated that the reflector walls 17 could be omitted with only a moderate increase in energy loss due to radiation. They are, however, cost effective in reducing energy consumption.

It will also be appreciated that mold heating might be provided by steam or oil heat and that, in the case of injection molding, a cooling medium might be utilized in order to maintain the injection molds at the desired lower temperature. Such variations fall within the scope of the present invention as will be appreciated by one skilled in the art.

I claim:

1. A mold support assembly for supporting a mold in a molding machine, comprising means for maintaining the temperature of the mold at a desired temperature and an insulating unit disposed between the temperature maintaining means and structure of a molding machine, said insulation unit having an insulating cavity defined by a mold support structure comprising peripheral channel members secured to interconnected, spaced "I" beams, and having thermally reflective means disposed in said cavity remote from said temperature maintaining means.

2. An assembly according to claim 1 where said thermally reflective means comprises silvered glass.

3. An assembly according to claim 1 wherein said cavity, except for a gap adjacent said reflective means is filled with a thermally insulating material.

4. An assembly according to claim 1 wherein said temperature maintaining means comprises a plurality of heating plates carrying electrical heating elements disposed to heat said mold means and a load distribution plate is disposed between said insulation unit and said temperature maintaining means from which it is spaced by a layer of insulating material.

5. An assembly according to claim 4 wherein said heating plates are separated from one another by a space filled with a thermally insulating material.

6. An assembly according to claim 5 wherein said load distribution plate includes grooves, superposed on the spaces between the heating plates and filled with an insulating material thereby to control heat flow through said load distribution plate from an area thereof adjacent one of said heating plates to areas thereof adjacent another of said heating plates.

7. An assembly according to claim 1 wherein said insulation unit is supported on a secondary platen adapted for mounting on a platen of a molding machine.

8. An assembly according to claim 1 wherein the interior of said insulation unit is the thermally reflective means.

9. An assembly according to claim 1 comprising a thermally reflective housing defining a substantially closed cavity surrounding the perimeter of the assembly.

10. A mold assembly for use in a compression molding process carried out in a hydraulic press having first and second relatively displaceable platens, said assembly comprising a secondary platen adapted for mounting on a said press platen but spaced therefrom by a layer of insulating material, an insulation unit supported on said secondary platen and extending to engage a load distribution plate adapted to provide backing support for a mold of substantially planar form and heating means disposed on said load distribution plate spaced therefrom by a layer of insulating material and adapted to heat a mold when supported thereon.

11. An assembly according to claim 10 wherein said insulation unit comprises a structure of minimal thermally conductive cross section, consistent with providing the strength necessary to transfer the force of the press to the molding operation, defining at least one cavity, substantially the entire area of which adjacent the secondary platen is covered by a thermally reflective element.

12. An assembly according to claim 10 wherein said heating means comprises a plurality of at least three heating plates each defining a groove carrying an electrical element, said plates being separated by insulated spaces to define separate heating zones for a mold when supported by said assembly.

13. An assembly according to claim 12 wherein said spaces between said heating plates are matched by grooves in said load distribution plates adjacent said plates and filled with an insulating material to limit and regulate heat flow from one said zone to another said zone.

14. An assembly according to claim 13 in combination with a mold supported on said heating plate and thermally reflective housing means adapted to extend from the associated platen of the press to the mold to define an insulating cavity surrounding the perimeter of said assembly.

15. A compression molding press incorporating an assembly according to claim 11 mounted on each said platen for cooperation with one another in a compression molding process.

16. An assembly according to claim 11 wherein said insulation unit is constructed of a high chrome stainless steel alloy having a relatively poor thermal conductivity in relation to other steels of similar strength, said load distribution means is constructed of a steel chosen as a relatively poor thermal conductor, said heating plates are constructed of a high alloy nickel, and said insulating layers are ceramic paper.

17. An assembly according to claim 11 wherein said heating plates incorporate heating elements totaling approximately 2,000 watts and said assembly is arranged for the support of the mold which is 12 inches square.

18. An assembly according to claim 11 wherein said heating plates incorporate heating elements totaling approximately 2,250 watts and said assembly is arranged for the support of the mold plate 24 inches square.

19. A mold support assembly for supporting a mold in a molding machine, comprising means for maintaining the temperature of the mold at a desired temperature and an insulating unit disposed between the temperature maintaining means and structure of a molding machine, said insulation unit having an insulating cavity defined by a mold support structure and having thermally reflective means disposed in said cavity remote from said temperature maintaining means, wherein said temperature maintaining means comprises a plurality of heating plats carrying electrical heating elements disposed to heat said mold means and a load distribution plate is disposed between said insulation unit and said temperature maintaining means from which it is spaced by a layer of insulating material.

20. An assembly according to claim 19 wherein said heating plates are separated from one another by a space filled with a thermally insulating material.

21. An assembly according to claim 20 wherein said load distribution plate includes grooves, superposed on the spaces between the heating plates and filled with an insulating material thereby to control heat flow through said load distribution plate from an area thereof adjacent one of said heating plates to areas thereof adjacent another of said heating plates.

22. An assembly according to claim 19 wherein the interior of said insulation unit is the thermally reflective means.

23. An assembly according to claim 19 comprising a thermally reflective housing defining a substantially closed cavity surrounding the perimeter of the assembly.

* * * * *